US010100560B2

(12) United States Patent
Anderson et al.

(10) Patent No.: US 10,100,560 B2
(45) Date of Patent: Oct. 16, 2018

(54) CONSOLE FOR VEHICLE INTERIOR (71) Applicant: Shanghai Yanfeng Jinqiao Automotive Trim Systems Co., Ltd., Plymouth, MI (US)

(72) Inventors: Rick Alan Anderson, Grand Haven, MI (US); Randy William Nurenberg, Hudsonville, MI (US)

(73) Assignee: Shanghai Yanfeng Jinquiao Automotive Trim Systems Co. Ltd., Novi, MI (US)

( * ) Notice: Subject to any disclaimer, the term of this patent is extended or adjusted under 35 U.S.C. 154(b) by 68 days.

(21) Appl. No.: 15/227,920

(22) Filed: Aug. 3, 2016

(65) Prior Publication Data

US 2016/0340942 A1 Nov. 24, 2016

Related U.S. Application Data (63) Continuation of application No. PCT/US2015/014437, filed on Feb. 4, 2015.
(Continued)

(51) Int. Cl.
*E05B 83/28* (2014.01)
*E05B 83/30* (2014.01)
(Continued)

(52) U.S. Cl.
CPC .............. *E05B 83/28* (2013.01); *B60R 7/04* (2013.01); *E05B 83/30* (2013.01); *E05B 83/32* (2013.01); *E05C 9/041* (2013.01); *E05C 9/042* (2013.01)

(58) Field of Classification Search
CPC .......... E05B 83/28; E05B 83/30; E05B 83/32; E05C 9/042; E05C 9/041; B60R 7/04
(Continued)

(56) References Cited

U.S. PATENT DOCUMENTS 5,265,450 A 11/1993 Doyle
6,120,069 A * 9/2000 Taranto .................. E05B 83/30
292/166
(Continued)

FOREIGN PATENT DOCUMENTS

DE 10036945 A1 2/2002
EP 1916132 A1 4/2008
(Continued)

OTHER PUBLICATIONS

Written Opinion of the International Search Authority dated Apr. 15, 2015 for PCT/US2015/014437.
(Continued)

*Primary Examiner* — Jason S Morrow
*Assistant Examiner* — E Turner Hicks (57) ABSTRACT A component for vehicle interior is disclosed. The component comprises a base, a bin and a cover. The cover is configured to move relative to the base from a closed position to cover the bin to an intermediate position to partially uncover the bin to an open position to uncover the bin. The cover provides a latch. The latch is configured to secure the cover to the base at the closed position, the intermediate position and the open position. The latch is also configured to release the cover from the base at the closed position, the intermediate position and the open position. The latch comprises a button and two arms. The button is configured to facilitate movement of the two arms between an extended position and a retracted position. The two arms engage with the base to secure the cover to the base when the two arms are at the extended position. The two arms disengage with the base to release the cover from the base when the two arms are at the retracted position.

20 Claims, 4 Drawing Sheets

Related U.S. Application Data (60) Provisional application No. 61/935,737, filed on Feb. 4, 2014.

(51) Int. Cl.
    *E05B 83/32*     (2014.01)
    *E05C 9/04*     (2006.01)
    *B60R 7/04*     (2006.01)

(58) Field of Classification Search
    USPC .................................. 296/37.12, 24.34, 57.1
    See application file for complete search history.

(56) References Cited

U.S. PATENT DOCUMENTS

| | | | |
|---|---|---|---|
| 8,033,582 B2 | 10/2011 | Sawatani et al. | |
| 9,676,340 B2* | 6/2017 | Ankolikar | E05D 15/502 |
| 2003/0006616 A1* | 1/2003 | Katoh | B60R 7/06 |
| | | | 292/32 |
| 2003/0209956 A1* | 11/2003 | Bae | B60N 2/4686 |
| | | | 312/324 |
| 2004/0017088 A1* | 1/2004 | Sawatani | E05B 83/30 |
| | | | 292/178 |
| 2004/0256859 A1* | 12/2004 | Yamada | E05B 83/30 |
| | | | 292/32 |
| 2005/0225095 A1* | 10/2005 | Geurden | E05B 15/1635 |
| | | | 292/39 |
| 2006/0055196 A1* | 3/2006 | Yamada | E05B 63/248 |
| | | | 296/37.12 |
| 2007/0123086 A1* | 5/2007 | Matsunaga | B60R 7/06 |
| | | | 439/310 |
| 2007/0289345 A1* | 12/2007 | Kozuka | E05B 83/30 |
| | | | 70/237 |
| 2008/0290685 A1* | 11/2008 | Ohnuki | E05L 31/0038 |
| | | | 296/76 |
| 2009/0038352 A1* | 2/2009 | Yamaguchi | B60R 7/06 |
| | | | 70/237 |
| 2011/0115246 A1 | 5/2011 | Beyer | |
| 2011/0309640 A1* | 12/2011 | Matsubara | E05B 63/248 |
| | | | 292/159 |
| 2012/0261937 A1* | 10/2012 | Buchheit | E05B 83/30 |
| | | | 296/37.12 |
| 2013/0270286 A1* | 10/2013 | Fukui | B65D 51/00 |
| | | | 220/811 |
| 2015/0152671 A1* | 6/2015 | Nakasone | E05B 83/30 |
| | | | 292/169 |
| 2015/0240539 A1 | 8/2015 | Abe | |
| 2016/0339848 A1 | 11/2016 | Hodgson | |
| 2017/0050572 A1 | 2/2017 | Anderson | |

FOREIGN PATENT DOCUMENTS

| | | |
|---|---|---|
| FR | 394843 | 10/1908 |
| FR | 2817897 A1 | 6/2002 |
| GB | 2130291 A | 5/1984 |
| JP | 2006076344 A | 3/2006 |
| JP | 2007056613 A | 3/2007 |
| JP | 2012225075 A | 11/2012 |
| WO | 2015120034 A1 | 8/2015 |
| WO | 2015123442 A2 | 8/2015 |

OTHER PUBLICATIONS

International Search Report dated Apr. 8, 2015 for PCT/US2015/014437.

International Search Report dated Sep. 7, 2015 for PCT/US2015/031822.

Written Opinion of the International Searching Authority dated Sep. 17, 2015 for PCT/US2015/031822.

First Office Action from the State Intellectual Property Office of People's Republic of China for CN Patent Application No. 201580018163.5 dated Jan. 24, 2018 (English translation) (12 pages).

Non-Final Office Action from the United States Patent and Trademark Office for U.S. Appl. No. 15/342,323 dated Dec. 21, 2017 (7 pages).

Non-Final Office Action from the United States Patent and Trademark Office for U.S. Appl. No. 15/229,402 dated Jan. 26, 2018 (5 pages).

\* cited by examiner

CONSOLE FOR VEHICLE INTERIOR

CROSS REFERENCE TO RELATED APPLICATION

The present application is a continuation of International Application No. PCT/US15/14437 titled "LATCH ASSEMBLY FOR A VEHICLE COMPARTMENT DOOR" filed Feb. 4, 2015.

The present application claims priority from and the benefit of and incorporates by reference in entirety of the following application: (a) U.S. Provisional Application No. 61/935,737 titled "LATCH ASSEMBLY FOR A VEHICLE COMPARTMENT DOOR," filed Feb. 4, 2014; (b) International Application No. PCT/US15/14437 titled "LATCH ASSEMBLY FOR A VEHICLE COMPARTMENT DOOR" filed Feb. 4, 2015.

FIELD

The present invention relates to a console for a vehicle interior. The present invention also relates to components for vehicle interior providing a latch assembly.

BACKGROUND

It is known to provide a console for vehicle interior. It is also known to provide a latch mechanism for a vehicle interior. It is also known to provide one or more storage compartments within the vehicle interior to store cargo and/or various items. It is also known to provide a storage compartment within a center console intended to store various items such as sunglasses, driving glasses, wallet, etc. It is also known to provide a storage compartment within an overhead console, an armrest, seats, door panels, and/or an instrument panel, etc. It is also known to provide a door configured to facilitate access of the storage compartment. It is further known to provide a latching mechanism (e.g. a latch assembly) to secure the door in an open position and/or a closed position and/or any position between the open position and the closed position.

It would be advantageous to provide an improved latching mechanism (e.g. a latch assembly) that is easy to operate and/or inexpensive to manufacture.

SUMMARY

The present invention relates to a component for a vehicle interior. The component comprises a base, a bin, a cover configured to move relative to the base from a closed position to cover the bin to an intermediate position to at least partially uncover the bin to an open position to uncover the bin and a latch coupled to the cover configured to release the cover from the base. The latch may be configured to secure the cover to the base in the closed position, the intermediate position and the open position; the cover may comprise a button configured to release the cover from the base. The latch may comprise the button; the button may be configured to move in a direction perpendicular to a direction of movement of the cover relative to the base. The latch may comprise a first arm and a second arm configured to release the cover from the base. The latch may comprise a linkage configured to substantially link movement of the second arm and the first arm; the first arm and the second arm may be configured to move from an extended position to a retracted position to disengage the cover from the base. The latch may comprise a spring configured to move the first arm and the second arm from the retracted position to the extended position to secure the cover to the base. The first arm may comprise a first pin and the second arm may comprise a second pin and wherein the first pin and the second pin may be configured to engage holes in the base to secure the cover to the base.

The present invention also relates to a component for a vehicle interior. The component comprises a base, a bin, a cover configured to move relative to the base from a closed position to cover the bin to an open position to uncover the bin, a button coupled to the cover and a latch coupled to the cover. The cover may be released from the base in response to actuation of the button. The latch may be configured to secure the cover to the base in the closed position and the open position. The latch may comprise a first side arm configured to translate in response to actuation of the button and a second side arm configured to translate in response to actuation of the button; translation of the first side arm and the second side arm may release the cover from the base. The latch may comprise a first wedge coupled to the first side arm configured to translate the first side arm in response to actuation of the button; the latch may comprise a second wedge coupled to the second side arm configured to translate the first side arm in response to actuation of the button. The latch may comprise a linkage configured to substantially link translation of the second side arm to translation of the first side arm.

The present invention further relates to a component for a vehicle interior. The component comprises a base, a bin, a cover configured to move relative to the base from a closed position to cover the bin to an open position to uncover the bin, a latch coupled to the cover comprising a button configured to release the cover from the base and a spring coupled to the cover. The spring may be configured to provide a first force to secure the cover to the base and a second force to prevent movement of the button. The latch may comprise a rack and pinion mechanism and the spring; the rack and pinion mechanism may comprise a gear and two racks; each rack may comprise an arm.

DESCRIPTION

Figure 1:
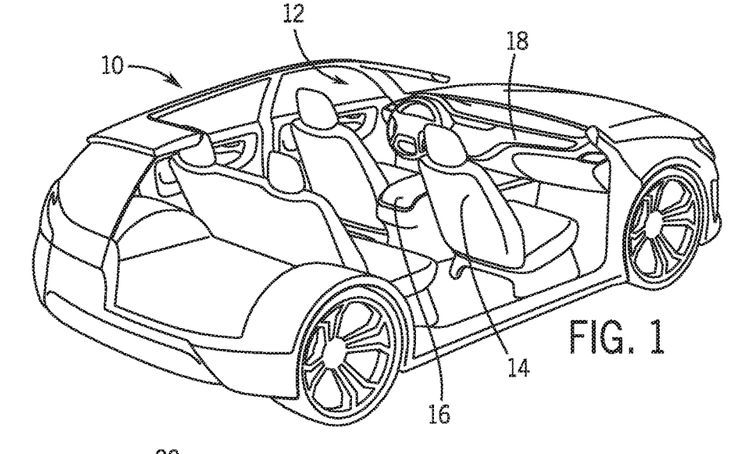
FIG. 1 is a schematic perspective view of a vehicle according to an exemplary embodiment.

Referring to FIG. 1, a vehicle 10 is shown including an interior 12 with a console shown as a center console 16 and a dashboard or instrument panel 18 according to an exemplary embodiment.

Figure 2A:
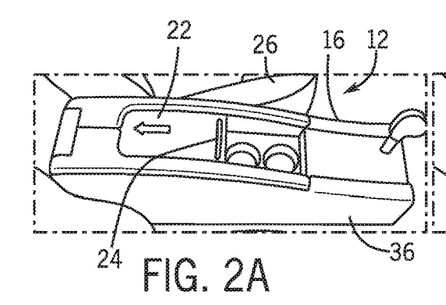
FIGS. 2A and 2B are schematic perspective views of a console for a vehicle interior according to an exemplary embodiment.
Figure 2B:
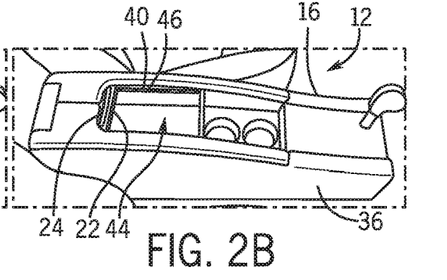
Figure 2C:
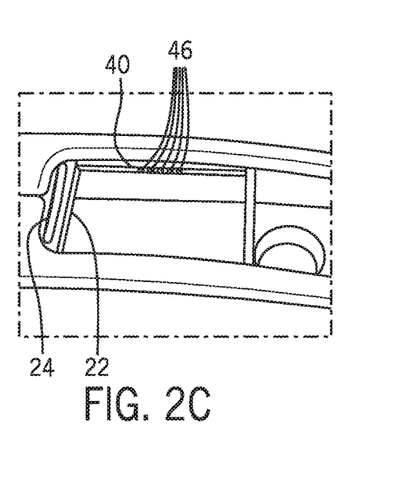
FIG. 2C is schematic detail view of the console according to an exemplary embodiment.

As shown schematically in FIGS. 2A and 2B, vehicle interior 12 comprises a console shown as center console 16. Center console 16 comprises a storage compartment 44. Center console 16 comprises a door shown as a tambour door 22; tambour door 22 facilitates access to storage compartment 44 according to an exemplary embodiment. As shown schematically in FIG. 2A, tambour door 22 is at a closed position; tambour door 22 covers storage compartment 44. As shown schematically in FIG. 2B, tambour door 22 is at an open position; storage compartment 44 is exposed. As shown schematically in FIG. 2B, center console 16 provides a track 40; track 40 is configured to facilitate movement of tambour door 22 between the closed position and the open position. As shown schematically in FIGS. 2A and 2B, tambour door 22 provides a latch assembly 24. According to an exemplary embodiment, latch assembly 24 is configured to secure tambour door 22 at various locations between the closed position and the open position. As shown schematically in FIG. 2C, track 40 provides holes 46; holes 46 are configured to engage with latch assembly 24 to secure tambour door 22 at various locations between the closed position and the open position according to an exemplary embodiment.

Figure 3:
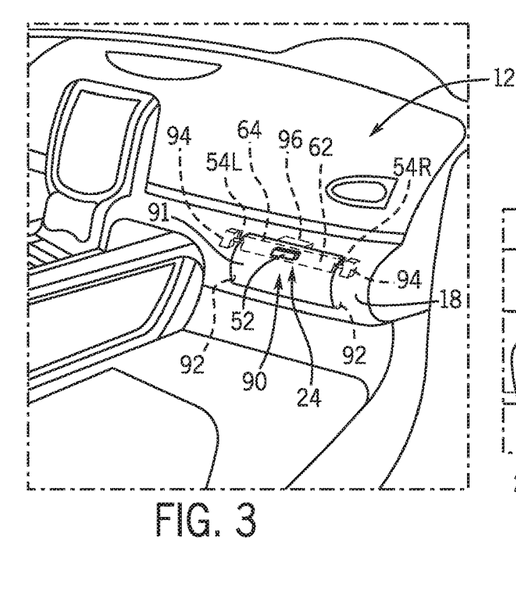
FIG. 3 is a schematic perspective view of a vehicle interior with a glove compartment according to an exemplary embodiment.

As shown schematically in FIG. 3, a vehicle interior 12 comprises a compartment shown as a glove compartment 90. Glove compartment 90 provides a door 91 configured to facilitate access of glove compartment 90. According to an exemplary embodiment, door 91 moves between a closed position and an open position. As shown schematically in FIG. 3, door 91 comprises latch assembly 24; latch assembly 24 is configured to secure door 91 at the closed position.

Figure 4:
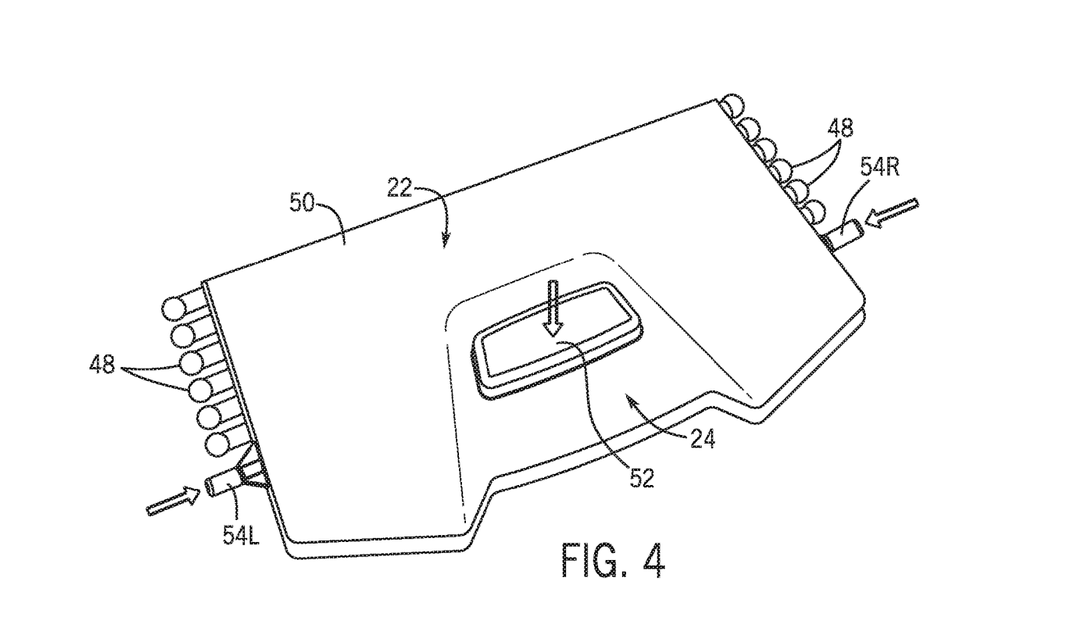
FIG. 4 is a schematic partial view of a cover for the console according to an exemplary embodiment.

As shown schematically in FIG. 4, tambour door 22 comprises a cover 50 and a series of parallel ribs 48 coupled to cover 50. According to an exemplary embodiment, the tip of each parallel rib 48 is configured to engage with track 40. Tambour door 22 provides latch assembly 24. As shown schematically in FIG. 4, latch assembly 24 provides a button 52 and pins 54L and pin 54R at opposing ends of tambour door 22. According to an exemplary embodiment, pin 54L and pin 54R move between an extended position (see FIGS. 6A and 7A) and a retracted position (see FIGS. 6B and 7B); button 52 provides a user control or interface to actuate (e.g. direct operation of) the latch assembly 24 (e.g. facilitate movement of pins 54 between the extended position and the retracted position).

Figure 5:
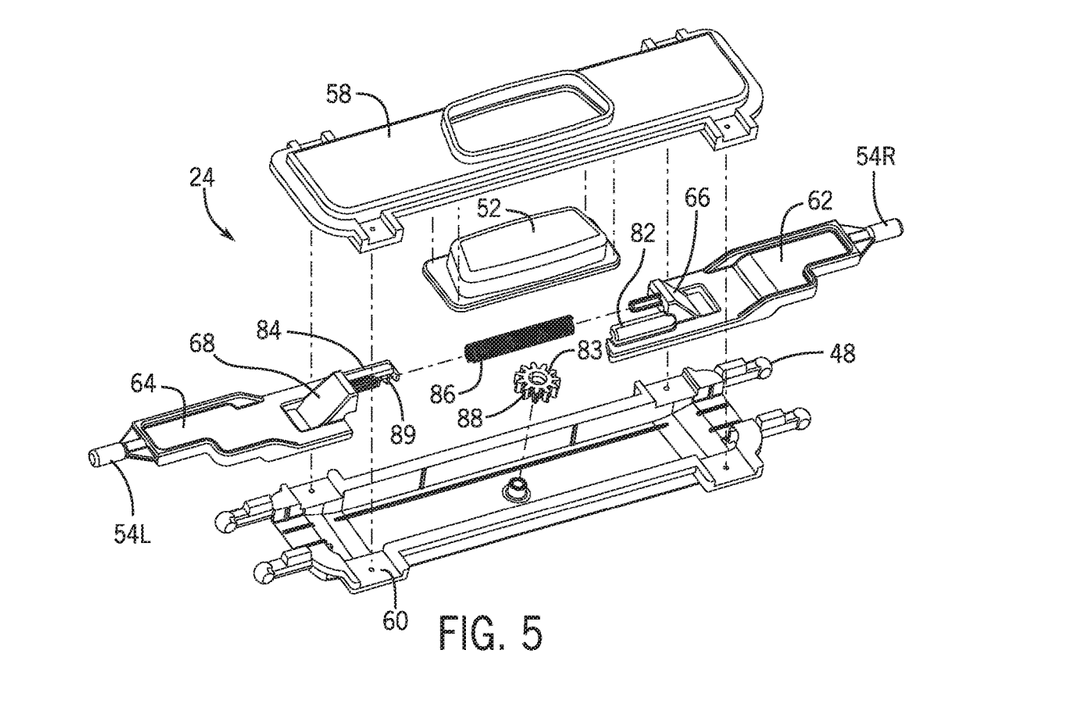
FIG. 5 is a schematic perspective exploded view of the latch assembly for the console according to an exemplary embodiment.

As shown schematically in FIG. 5, latch assembly 24 comprises an upper housing 58 and a lower housing 60. Latch assembly 24 also comprises a spring 86, an arm 64, an arm 62 and a gear shown as a pinion 83 between upper housing 58 and lower housing 60. According to an exemplary embodiment, arm 62 comprises rack 82 and wedge 66; arm 64 comprises rack 84 and wedge 68. According to an exemplary embodiment, wedge 66 and wedge 68 are configured to engage with button 52. Rack 82 and rack 84 provides teeth 89 to engage teeth 88 on pinion 83; spring 86 is configured to couple arm 62 and arm 64; spring 86 is biased to push arm 62 and arm 64 outward to the extended position. According to an exemplary embodiment, pin 54L and pin 54R on the end of arm 62 and arm 64 are intended to engage with holes 46 on track 40 to secure tambour door 22 at a position between the closed position and the open position.

Figure 6A:
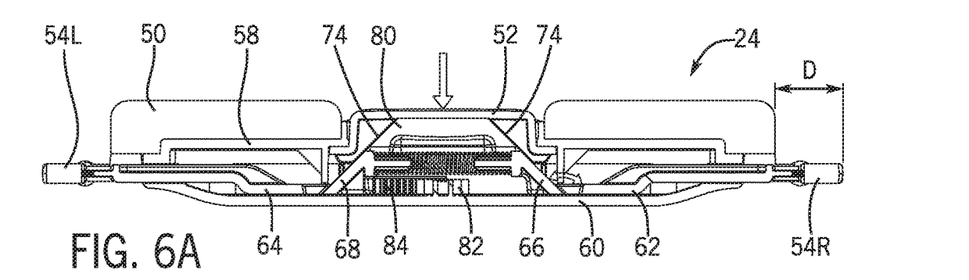
FIGS. 6A and 6B are schematic cross-section views of a latch assembly for the console according to an exemplary embodiment.

As shown schematically in FIG. 6A, pin 54L and pin 54R are at the extended position. As shown schematically in FIG. 5, arm 62 provides a wedge 66; arm 64 provides a wedge 68; button 52 provides two surfaces 74 configured to engage with wedge 66 and wedge 68.

Figure 6B:
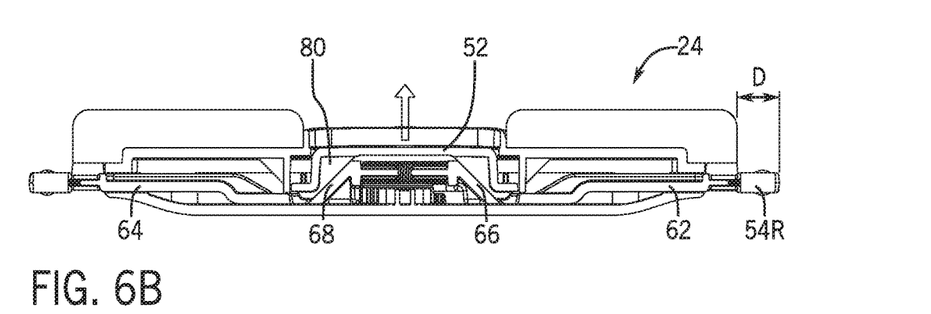

As shown schematically in FIG. 6B, button 52 is at a depressed position; the engagement between surfaces 74, wedge 66 and wedge 68 pulls arm 62 and arm 64 towards the retracted position; spring 86 is compressed between arm 62 and arm 64. As shown schematically in FIGS. 6A and 6B, a distance D is the distance between the tip of pin 54R and the edge of cover 50; distance D decreases as pin 54R moves from the extended position to the retracted position.

Figure 7A:
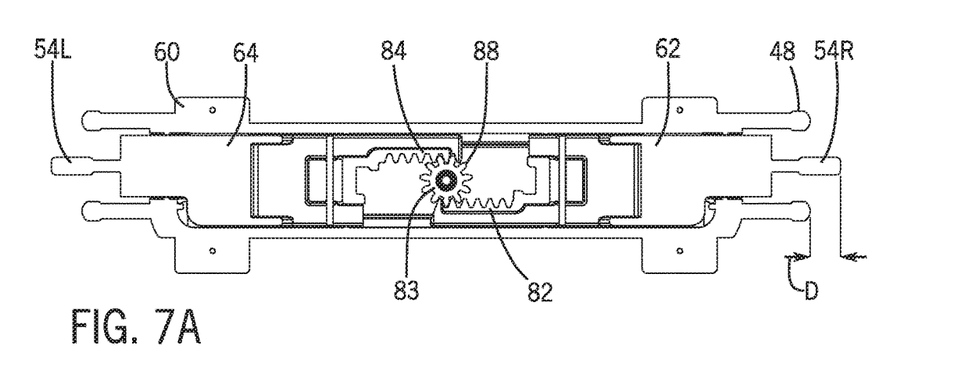
FIGS. 7A and 7B are schematic top views of the latch assembly for the console according to an exemplary embodiment.
Figure 7B:
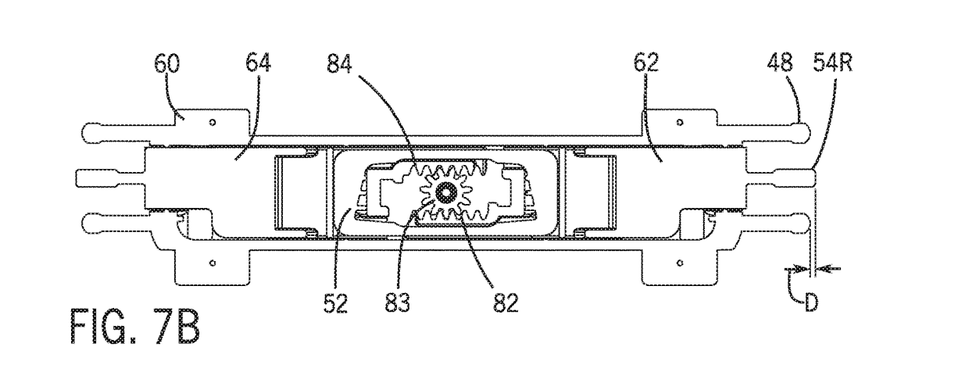

As shown schematically in FIG. 7A, pin 54L and pin 54R are at the extended position; as shown schematically in FIG. 7B, pin 54L and pin 54R are at the retracted position when button 52 is in the depressed position. As shown schematically in FIGS. 7A and 7B, a distance D is the distance between the tip of pin 54R and the tip of pin 48; distance D decreases as pin 54R moves from the extended position to the retracted position. As shown schematically in FIGS. 7A and 7B, arm 62 comprises rack 82; the teeth on rack 82 engage with teeth 88 on pinion 83; arm 64 comprises rack 84; the teeth on rack 84 engage with teeth 88 on pinion 83; pin 54L and pin 54R on the end of arm 62 and arm 64 are intended to engage with holes 46 on track 40 to secure tambour door 22 at a position between the closed position and the open position. See also FIG. 2B. According to an exemplary embodiment, arm 62 and arm 64 are coupled to pinion 83 by a rack and pinion mechanism; arm 62 and arm 64 move in coordination toward the center of latch assembly 24 (e.g. at pinion 83).

Figure 8A:
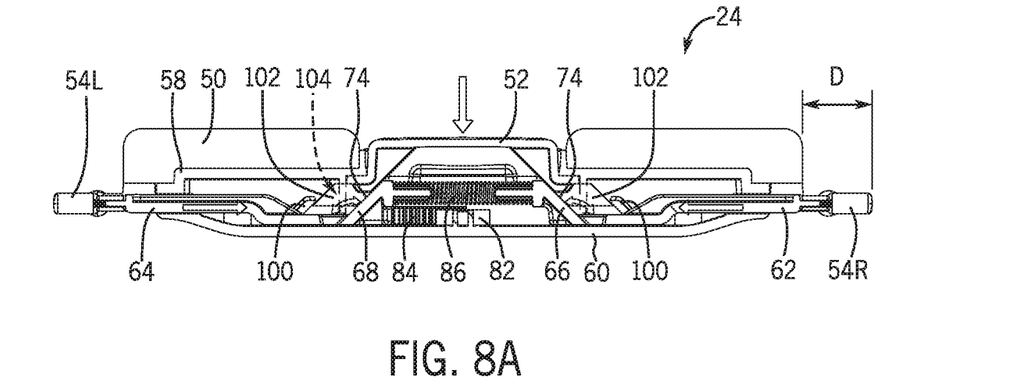
FIGS. 8A to 8C are schematic cross-section views of a latch assembly for the console according to an exemplary embodiment.

As shown schematically in FIG. 8A, pin 54L and pin 54R are at the extended position. As shown schematically in FIG. 8A, arm 62 provides a wedge 66; arm 64 provides a wedge 68; button 52 provides two surfaces 74 configured to engage with wedge 66 and wedge 68. As shown schematically in FIG. 8A, arm 62 provides a feature shown as a flap 100; arm 64 provides a feature shown as a flap 100; button 52 also provides two opposing tabs 102; each tab 102 provides an edge 106; upper housing 58 provides two opposing walls 104. According to an exemplary embodiment, each tab 102 is configured to engage with the corresponding flap 100. According to an exemplary embodiment, the contact between flap 100 and the corresponding tab 102 along the corresponding edge 106 is intended to secure button 52 in the depressed position; lateral movement of button 52 relative to upper housing 58 is generally blocked by walls 104.

Figure 8B:
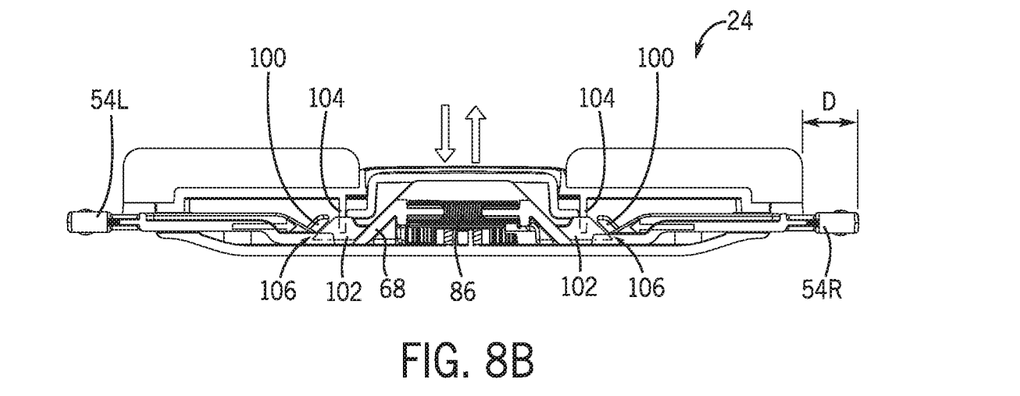

As shown schematically in FIG. 8B, pin 54L and pin 54R are at an intermediate position between the extended position and the retracted position. As shown schematically in FIG. 8C, button 52 is at a depressed position; the engagement between surfaces 74, wedge 66 and wedge 68 pulls arm 62 and arm 64 towards the retracted position; spring 86 is compressed between arm 62 and arm 64. As shown schematically in FIGS. 8A, 8B and 8C, a distance D is the distance between the tip of pin 54R and the edge of cover 50; distance D decreases as pin 54R moves from the extended position (see FIG. 8A) through the intermediate position (see FIG. 8B) to the retracted position (see FIG. 8C).

As indicated according to an exemplary embodiment, the latch mechanism/assembly (e.g. as actuated by the button) can be configured to secure/release a door/cover at an open and closed and intermediate positions. See FIGS. 2A to 2C, 6A, 6B, 7A, 7B and 8A to 8C.

EXEMPLARY EMBODIMENTS

As shown schematically in FIG. 1, center console 16, dash 18 and/or other areas within interior 12 may include a storage compartment having a door and a latch assembly; the latch assembly may selectively secure the door of the storage compartment. According to an exemplary embodiment, the storage compartment may employ a tambour door having a latch assembly; the latch assembly secures the tambour door in one or more locations. According to an exemplary embodiment, the tambour door may provide pins on opposing sides of tambour door; pins may be configured to engage a track at one or more securing points to enable the tambour door to be secured along an opening of the storage compartment. According to an exemplary embodiment, the latch assembly may also include a button; the button is configured to move the pins laterally inward (retracted from the securing points of the track) as the button is depressed; retracting the pins out of the securing holes of the track enables movement of the tambour door. According to an exemplary embodiment, dash 18 may include a glove compartment that is covered by a door; the door is held in a closed position by a latch assembly (see also FIG. 3).

According to an exemplary embodiment, a door for a storage compartment may include (e.g. operate according to) a number of methods of securing the covers and/or doors to the storage compartment at a desired position; the door for the storage compartment may suffer from accidental unlatching during use. According to an exemplary embodiment, when a vehicle occupant rests an arm or an elbow on a center console, the door for the center console may be opened accidentally; the door may include a latch mechanism; the latch mechanism may form an unsightly, loose, or uncomfortable bump above the surface of the door. According to an exemplary embodiment, latch mechanism with a low-profile design may improve aesthetic appeal and mechanical functionality.

As shown schematically in FIGS. 2A and 2B, center console 16 may include a storage compartment 44 covered by a tambour door 22 having a latch assembly 24; center console 16 is coupled to a floor of vehicle interior 12 between the front seats 26. According to an exemplary embodiment, center console 16 is configured to provide a storage compartment and an armrest for vehicle occupants.

According to an exemplary embodiment, center console 16 includes a tambour door 22 configured to transition between an open position and a closed position; tambour door 22 includes a latch assembly 24; latch assembly 24 is intended to enable a vehicle occupant to secure tambour door 22 at a number of positions between and including the open position and the closed position. According to an exemplary embodiment, sliding tambour door 22 toward the open position will expose an interior of storage compartment 44 located within center console 16; tambour door 22 is shown as a tambour door having a series of substantially parallel ribs coupled to a substrate. According to an exemplary embodiment, the ribs are configured to engage a track within a base 36 of center console 16; the substrate enables tambour door 22 to flex and accommodate the contours of the opening of storage compartment 44. According to an exemplary embodiment, tambour doors may be positioned throughout the interior of the vehicle; storage compartment may be located within an overhead console, door panel, instrument panel, dash, or other region of the interior; the tambour door may provide a latch assembly; other interior trim components (in addition to the tambour doors) may include similar latch assemblies. According to an exemplary embodiment, a latch assembly may enable a vehicle occupant to retain the door (e.g. tambour door 22) in a desired position over the storage compartment without accidental unlatching.

As shown schematically in FIG. 2B, center console 16 include rails or tracks 40 configured to facilitate movement of tambour door 22. According to an exemplary embodiment, tracks 40 may include a C-shaped cross section; tracks 40 may be coupled to the side panels of center console 16 or integrally formed within the side panels. According to an exemplary embodiment, the ribs of tambour door 22 include protrusions configured to engage the tracks 40 and support tambour door 22; the ribs are attached to the substrate of tambour door 22; the substrate enables tambour door 22 to flex and accommodate the contours of the opening 32 of storage compartment 44; transitioning tambour door 22 to the open position exposes an interior of storage compartment 44 within the center console 16.

According to an exemplary embodiment, a vehicle occupant may close tambour door 22 by grasping a button or button handle of latch assembly 24 and moving tambour door 22 toward the front of the center console 16. As the vehicle occupant pulls tambour door 22 forward, pins of the assembly latch 24 may engage securing holes 46 (e.g. recesses) positioned along the tracks 40. According to an exemplary embodiment, each securing hole 46 in one track 40 has a corresponding securing hole in the opposite track 40 (e.g. the securing holes are longitudinally aligned); the pins in tambour door 22 may both enter the opposing securing holes 46 at the same time. The opposing pins of the latch assembly 24 move in and out together. According to an exemplary embodiment, the pins remain secured in the securing holes 46 until both pins are extracted; wear may be reduced on the latch assembly 24; the possibility of tambour door 22 accidentally unlatching and opening may also be reduced. When tambour door 22 is in the closed position, the exterior surface of tambour door 22 may provide a suitable surface as an armrest (e.g. for writing and/or storage of small items).

As shown schematically in FIG. 3, the glove compartment 90 includes a door 91. According to an exemplary embodiment, the door may slide open along a track. According to an exemplary embodiment, the door may also be a firm panel door configured to hold a contour of the dash 18. According to an exemplary embodiment, the panel door may be installed in other areas of the interior of the vehicle. The door 91 may pop open, rotating down with a hinge 92 at the bottom of the glove compartment 90; the latch assembly 24 may include a right side arm 62, a left side arm 64 and a button 52. A left pin 54L is connected to the left side arm 64; a right pin 54R is connected to the right side arm 62; the side arms are received by receptacles 94 that lock the compartment 90 closed. When the button 52 is depressed, side arms 62 and side arm 64 pull pin 54L and pin 54R out of the corresponding receptacles 94 and the glue compartment 90 comes open. To assist in opening the glue compartment 90, a bumper 96 may be installed behind the latch assembly 24. The bumper 96 may be compressed and pushed against the glove compartment 90 when the glove compartment 90 is closed; when the button 52 is pushed and pin 54L and pin 54R exit the receptacles 94 the bumper 96 pushes the glove compartment 90 away from the dash 18. According to an exemplary embodiment, the latch assembly 24 may be installed within the dash 18 of the vehicle interior with the receptacles installed within the door 91. According to an exemplary embodiment, door 91 can be constructed with less material, creating a cleaner look when door 91 is in an open position.

As shown schematically in FIG. 4, tambour door 22 includes multiple substantially parallel ribs 48 coupled to a substrate 50. Ribs 48 are configured to engage the tracks 40 of center console 16 to support tambour door 22 and to facilitate movement of tambour door 22 across the opening of the storage compartment 38; the ribs 46 are coupled to a surface of the substrate 50 facing the interior of center console 16 (forming a unitary structure). Tambour door 22 may flex in a direction perpendicular to the orientation of the ribs 48, enabling tambour door 22 to match the contours of a curved storage compartment opening.

As shown schematically in FIG. 4, tambour door 22 includes a latch assembly 24 configured to selectively block movement of tambour door 22 in a desired position (e.g. the open position, the closed position, partly closed position, etc.). The latch assembly 24 includes a button 52. According to an exemplary embodiment, a latch assembly may employ other components (e.g. knobs, recesses, etc.) in place of the button to control movement of the door. The latch assembly 24 includes left pin 54L and right pin 54R; left pin 54L and right pin 54R engage the securing holes 46 in the tracks 40 according to an exemplary embodiment. As shown schematically in FIG. 4, the button 52 is constructed to be flush with the substrate 50 when button 52 is in a raised position. According to an exemplary embodiment, a vehicle occupant can rest an arm or an elbow on the substrate 50 of tambour door 22 without accidentally opening tambour door 22; the aesthetic appearance may be enhanced. The button 52 may be designed to receive a force from a vehicle occupant to release pin 54L and pin 54R; button 52 may receive a force in the downward direction, perpendicular to the surface of the substrate 50. As the button 50 moves in the downward direction, pin 54L and pin 54R are retracted and extracted from the recesses to facilitate movement of tambour door 22.

As shown schematically in FIG. 5, latch assembly 24 includes an upper housing 58, a lower housing 60. A right side arm 62 and a left side arm 64 may be installed within upper housing 58 and lower housing 60. A spring 86 is between side arm 62 and side arm 64 to extend side arm 62 and side arm 64 away from each other. Latch assembly 24 also includes a pinion 83 intended to ensure the movement of right side arm 62 is substantially equal to the movement of left side arm 64; latch assembly 24 also includes a button 52 to receive a force in the downward direction from a vehicle occupant.

As shown schematically in FIG. 6A, latch assembly 24 includes button 52, pin 54L and pin 54R; pin 54L and pin 54R are configured to engage the track 40 of storage compartment 44; latch assembly 24 also includes upper housing 58 and lower housing 60. According to an exemplary embodiment, upper housing 58 may be coupled to substrate 50; button 52 is intended to be flush with substrate 50 when button 52 is unpressed; button 52 moves below the level of substrate 50 when a vehicle occupant applies a force in the downward direction to the button 52. As shown schematically in FIG. 6A, latch assembly 24 is in the raised position (unpressed and flush with the top surface of substrate 50). In the raised position, the button 52 is up and the pin 54L and pin 54R are extended outward to the left and the right. Pin 54L is part of left side arm 64; pin 54R is part of right side arm 62; pin 54L and pin 54R respond to movement of the button 52 in the downward direction. Right side arm 62 includes a right wedge 66; left side arm 64 includes a left wedge 68. Each wedge (e.g. wedge 66 and wedge 68) in relation to its respective side arm (e.g. side arm 62 and side arm 64). The angle of each wedge may be configured to match an angle formed on matching surfaces 74 of the button 52. When the button 52 moves downward, the matching surfaces 74 engage with wedge 66 and wedge 68 and apply a force to wedge 66 and wedge 68.

According to an exemplary embodiment, the force from button 52 drives the right wedge 66 to slide to the left as the matching surface 74 slides down along the surface of wedge 66. The movement of 66 pulls the right side arm 62 to the left; right side arm 62 includes pin 54R. The left wedge 68 engages matching surface 74 of button 52, and slides to the right. The movement of left wedge 68 to the right drives left side arm 64 and pin 54L to the right 78. As shown schematically in FIG. 6A, left side arm 64 and right side arm 62 are approximately 180 degrees from one another. According to an exemplary embodiment, the angle between the left side arm and the right side arm may be different from 180 degrees; the left direction and the right direction are not necessarily opposite one another as shown schematically in FIG. 6A. Button 52 includes a cavity 80 that is configured to receive wedge 66 and wedge 68 when right side arm 62 slides to the left and left side arm 64 slides to the right. The movements of side arm 62 and side arm 64 extracts the pin 54R and pin 54L respectively from the recesses and enables movement of the compartment door.

Side arm 62 and side arm 64 include an interlocking section 84. As shown in FIG. 6A, only the interlocking section 84 of the left side arm 64 is visible. Latch assembly 24 also includes a spring 86 coupled to (or coupled between) right side arm 62 and left side arm 64. Spring 86 pushes right side arm 62 to the right direction and pushes left side arm 64 to the left direction; spring 86 provides a force to return side arm 62 and side arm 64 and button 52 to the position shown in FIG. 6A. According to an exemplary embodiment, other mechanisms may be used to restore the side arms 62, 64 and the button 52. According to an exemplary embodiment, each side arm may include an individual spring; each arm may include an elastic band connected to the housing; a compressible material may be placed between the side arms.

As shown schematically in FIG. 7A, latch assembly 24 includes right side arm 62, left side arm 64, left pin 54L, right pin 54R and lower housing 60. Button 52 is in the raised position; side arm 62 and side arm 64 extend outward; the interlocking section 84 of left side arm 64 and an interlocking section 82 of right side arm 62 are shown. Interlocking section 82 and interlocking section 84 include teeth 89 that match corresponding teeth 88 on pinion 83. As shown schematically in FIG. 7A, pinion 83 is coupled to lower housing 60; pinion 83 may rotate in response to the movement of side arm 62 and side arm 64.

According to an exemplary embodiment, pinion 83 ensures the movement of right side arm 62 in the left direction and the movement of left side arm 64 in the right direction are substantially equal. (According to an exemplary embodiment, one side arm may move between 95 percent and 105 percent of the distance moved by the other side arm.) According to an exemplary embodiment, the substantially equal movement between side arm 62 and side arm 64 enables latch assembly 24 to stably secure a door (e.g. tambour door 22). Pin 54L and pin 54R are inserted and extracted from the corresponding recesses concurrently; the interlocking of side arm 62 and side arm 64 enable latch assembly 24 to apply equal force to the sides of tracks 40 when latch assembly 24 is used in conjunction with a tambour door. According to an exemplary embodiment, when the pins are not secured within securing holes the pins push against the tracks 40 and center the latch assembly 24 and tambour door 22 laterally within the track, keeping tambour door 22 from rattling (which may reduce noise and reduce wear on the tambour door 22).

As shown schematically in FIG. 6B, button 52 is depressed; when button 52 is moved downward, right side arm 62 is translated to the left and left side arm 64 is translated to the right. The translation of side arm 62 and side arm 64 also pulls wedge 66 and wedge 68 together so wedge 66 and wedge 68 fit into cavity 80 of button 52. The movement of side arm 62 and side arm 64 extracts the pin 54L and pin 54R from the recesses and enables movement of tambour door 22.

As shown schematically in FIG. 7B, button 52 is moved downward; side arm 62 and side arm 64 are moved together. Right side arm 62 moves in the left direction and the teeth of interlocking section 82 rotate the pinion 83 while interacting with teeth 88 on pinion 83. As shown in FIG. 7B, left side arm 64 and right side arm 62 move substantially equal distances due to the interaction of the interlocking sections 82, 84 with the pinion 83. According to an exemplary embodiment, substantially equal movement of side arm 62 and side arm 64 may provide increased securing of latch assembly 24 and self-centering of latch assembly 24 and tambour door 22 into which latch assembly 24 is installed.

As shown schematically in FIG. 8A, latch assembly 24 includes button 52 and pin 54L and pin 54R; pins 54L and 54R engage track 40 of a compartment within the vehicle; latch assembly 24 includes upper housing 58 and lower housing 60. Upper housing 58 may be coupled to substrate 50; button 52 is intended to be flush with substrate 50 and moves below the level of substrate 50 when a vehicle occupant applies a force in the downward direction to button 52. As shown schematically in FIG. 8A, latch assembly 24 is in the raised or uncompressed position; button 52 is up and pin 54L and pin 54R are extended outward to the left and the right. Pin 54R is part of a right side arm 62; pin 54L is part of a left side arm 64; both pins respond to movement of button 52 in the downward direction. Right side arm 62 includes right wedge 66; left side arm 64 includes left wedge 68; each wedge (e.g. wedge 66 and wedge 68) forms an angle in relation to its respective side arm (e.g. side arm 62 and side arm 64). The angles may be configured to match angles of respective matching surfaces 74 of button 52. When button 52 moves downward, matching surfaces 74 engage with wedge 66 and wedge 68 and apply a force to wedge 66 and wedge 68; each of right side arm 62 and left side arm 64 includes a supporting flap 100 configured to substantially match the angle of matching surfaces 74 of wedge 66 and wedge 68. Each supporting flap 100 engages a respective angled tab 102 that extends laterally outward from button 52 toward pin 54L and pin 54R. The engagement of supporting flap 100 and angled tab 102 blocks lateral shifting of button 52 in relation to side arm 62 and side arm 64; each angled tab 102 may be aligned via engagement with a respective aligning slit 104 in upper housing 58 of latch assembly 24. Each angled tab 102 protrudes through the respective aligning slit 104 and lateral movement of tab 102 relative to upper housing 58 is substantially blocked by slit 104.

Figure 8C:
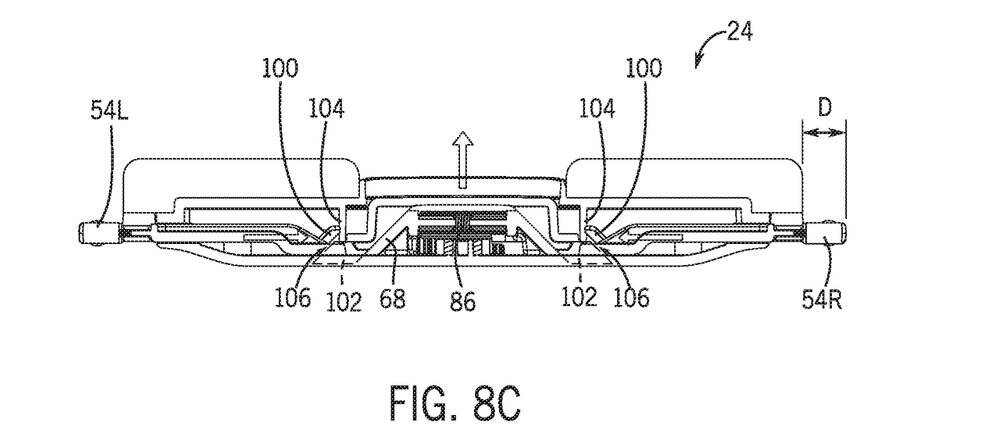

As shown schematically in FIG. 8C, button 52 is depressed in the downward direction; wedge 66 and wedge 68 are pulled together to fit into cavity 80 of button 52; right side arm 62 translates to the left; left side arm 64 translates to the right. Supporting flaps 100 translate with side arm 62 and side arm 64 while maintaining contact with an edge 106 of each angled tab 102. The contact along the edge 106 secures button 52 in the depressed position when the side arms are in the retracted position laterally. Button 52 is blocked from traveling upward while right side arm 62 and left side arm 64 are in the retracted position laterally; when tambour door 22 is opened slightly and pin 54L and pin 54R are held inward (i.e. right side arm 62 is displaced to the left and left side arm 64 is displaced to the right), button 52 is blocked from moving upward via supporting flaps 100. According to an exemplary embodiment, latch assembly 24 may be installed upside down (e.g. inverted arrangement in which the button faces downward); the supporting flaps 100 block button movement to the uncompressed position. When side arm 62 and side arm 64 are not blocked spring 86 forces side arm 62 and side arm 64 outward and wedge 66 and wedge 68 force button 52 to move towards the uncompressed position (flush with substrate 50) maintaining a secure fit that minimizes shaking of button 52.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A component for a vehicle interior comprising:
   (a) a base;
   (b) a bin;
   (c) a cover configured to slide relative to the base (1) from a closed position to cover the bin (2) to a partially open position to at least partially uncover the bin (3) to an open position to uncover the bin; and
   (d) a latch coupled to the cover configured to release the cover from the base;
   wherein the latch is configured to secure the cover to the base in the closed position, the partially open position and the open position.

2. The component of claim 1 wherein the cover comprises a button configured to release the cover from the base.

3. The component of claim 2 wherein the latch comprises the button.

4. The component of claim 2 wherein the button is configured to move in a direction perpendicular to a direction of movement of the cover relative to the base.

5. The component of claim 1 wherein the latch comprises a first arm and a second arm configured to release the cover from the base.

6. The component of claim 5 wherein the latch comprises a linkage configured to substantially link movement of the second arm and the first arm.

7. The component of claim 5 wherein the first arm and the second arm are configured to move from an extended position to a retracted position to disengage the cover from the base.

8. The component of claim 7 wherein the latch comprises a spring configured to move the first arm and the second arm from the retracted position to the extended position to secure the cover to the base.

9. The component of claim 5 wherein the first arm comprises a first pin and the second arm comprises a second pin and wherein the first pin and the second pin are configured to engage holes in the base to secure the cover to the base.

10. A component for a vehicle interior comprising:
 (a) a base;
 (b) a bin;
 (c) a cover configured to move relative to the base from a closed position to cover the bin to an open position to uncover the bin;
 (d) a button coupled to the cover; and
 (e) a latch coupled to the cover;
 wherein the cover is configured to be released from the base in response to actuation of the button; and
 wherein the latch is configured to secure the cover to the base in the open position.

11. The component of claim 10 wherein the latch is configured to secure the cover to the base in the closed position and in the open position.

12. The component of claim 10 wherein the latch comprises a first side arm configured to translate in response to actuation of the button and a second side arm configured to translate in response to actuation of the button; wherein translation of the first side arm and the second side arm releases the cover from the base.

13. The component of claim 12 wherein the latch comprises a first wedge coupled to the first side arm configured to translate the first side arm in response to actuation at the button.

14. The component of claim 13 wherein the latch comprises a second wedge coupled to the second side arm configured to translate the first side arm in response to actuation of the button.

15. The component of claim 14 wherein the latch comprises a linkage configured to substantially link translation of the second side arm to translation of the first side arm.

16. A component for a vehicle interior comprising:
 (a) a base;
 (b) a bin;
 (c) a cover configured to slide relative to the base from a closed position to cover the bin to an open position to uncover the bin;
 (d) a latch coupled to the cover comprising a button configured to release the cover from the base; and
 (e) a spring coupled to the cover;
 wherein the spring is configured to provide a force to secure the cover to the base.

17. The component of claim 16 wherein the latch further comprises a rack and pinion mechanism and the spring.

18. The component of claim 17 wherein the rack and pinion mechanism comprises a gear and two racks.

19. The component of claim 18 wherein each rack comprises an arm.

20. The component of claim 16 wherein the spring is configured to provide a force to prevent movement of the button.

* * * * *